United States Patent [19] [11] 4,041,143
Fujiki et al. [45] Aug. 9, 1977

[54] PROCESS FOR PREPARING FIBROUS ALKALI METAL TITANATE

[75] Inventors: Yoshinori Fujiki; Fujio Izumi, both of Sakura, Japan

[73] Assignee: National Institute for Researches in Inorganic Materials, Ibaraki, Japan

[21] Appl. No.: 668,535

[22] Filed: Mar. 19, 1976

[30] Foreign Application Priority Data

Mar. 20, 1975 Japan .................................. 50-034027

[51] Int. Cl.² ...................... C01G 23/00; C01D 13/00; C01D 17/00
[52] U.S. Cl. ...................................... 423/598; 252/62; 423/DIG. 12
[58] Field of Search .................. 423/593, 598, 659 A; 252/62

[56] References Cited

U.S. PATENT DOCUMENTS

| 2,841,470 | 7/1958 | Berry | 423/598 |
| 3,331,660 | 7/1967 | Berry et al. | 423/598 |
| 3,760,068 | 9/1973 | Winter et al. | 423/598 |
| 3,952,090 | 4/1976 | Shimizer et al. | 423/598 |

FOREIGN PATENT DOCUMENTS

| 204,997 | 1/1968 | U.S.S.R. | 423/598 |

OTHER PUBLICATIONS

Beck et al. (1), "APC Application Ser. No. 292,742", Published 7/13/43.
Beck et al. (2), "APC Application Ser. No. 393,258", Published 7/13/43.

Primary Examiner—Herbert T. Carter
Attorney, Agent, or Firm—Oblon, Fisher, Spivak, McClelland & Maier

[57] ABSTRACT

Fibrous alkali metal titanate is prepared by mixing 5–50 mole % of an alkali metal titanate or an alkali metal titanate forming components with a flux of an alkali tungstate or molybdate, and heating the mixture at 700°–1,350° C to grow the fibrous product in the molten flux mixture.

5 Claims, No Drawings

PROCESS FOR PREPARING FIBROUS ALKALI METAL TITANATE

BACKGROUND OF THE INVENTION

1. Field of the Invention

The present invention relates to a process for preparing fibrous alkali metal titanate which is useful as a heat resistant and heat insulating material.

2. Description of the Prior Art

Alkali metal titanates are compounds having the formula:

$$M_2O(TiO_2)_n$$

wherein M represents an alkali metal and n is from 1 to 7. Heretofore, fibrous alkali metal silicates have been prepared by using the flux method, the hydrothermal method or the calcination method.

From the industrial viewpoint, the flux method and the calcination method are superior to the hydrothermal method which uses an expensive and danger autoclave. In the former methods, continuous operation on a large scale can be attained.

However, the calcination method has the disadvantage of preparing only microscopic size fibrous alkali metal titanates, though the process is simple because of the solid phase reaction.

The conventional flux method has the disadvantage of pollution caused by the large amount of toxic gas produced by the fluorine and chlorine containing components of the flux during the operation because an alkali metal halide such as potassium fluoride, potassium chloride, etc. is used under high vapor pressure.

SUMMARY OF THE INVENTION

It is an object of the present invention to provide a process for preparing fibrous alkali metal titanate having a relatively large size in economical manner.

It is another object of the present invention to provide a continuous process for preparing a fibrous alkali metal titanate by using a flux which imparts no pollution and can be recovered.

Yet another object of the present invention is to provide a process for preparing fibrous alkali metal titanate having excellent characteristics for use as a heat resistant and heat insulating material.

The objects of the present invention have been attained by heating a mixture of from 5 to 50 mole % of an alkali metal titanate or an alkali metal titanate-forming components with a flux of an akali metal tungstate or molybdate at 700°–1,350° C to melt it, whereby the fibrous alkali metal titanate is grown in the molten flux mixture.

The length of the fibrous alkali metal titanate produced is usually in the range of 10 $\mu$ to 50 mm, preferably 50 $\mu$ to 20 mm.

The diameter of the fibrous alkali metal titanate is usually less than 1/5 preferably less than 1/10 than the length thereof.

DETAILED DESCRIPTION OF THE PREFERRED EMBODIMENTS

The alkali metal tungstate ($M_2WO_4$) or the alkali metal molybdate ($M_2MoO_4$) comprises an alkali metal designated as M which has an atomic number of at least 11 such as sodium, potassium, rubidium or cesium.

The alkali metal titanates which are prepared by the process of the invention have the formula $$M_2O(TiO_2)_n,$$

wherein M represents an alkali metal having an atomic number of at least, 11 such as sodium, potassium, rubidium and cesium; and n represents 1 to 7 preferably 4 to 6.

The alkali metal titanates having the formula $M_2O(TiO_2)_n$ can be obtained by using a mixture of amorphous or crystalline titanium dioxide (preferably in powder form) with an alkali metal carbonate ($M_2CO_3$) or an alkali metal hydroxide (MOH) at a desirable molar ratio. The non-fibrous or powdery alkali metal titanates can be prepared by using said mixture and accordingly the mixtures can be the alkali metal titanate-forming components.

That is, it is possible to add an alkali metal titanate in the flux and it is also possible to add a mixture of titanium oxide and an alkali metal carbonate or hydroxide.

The order of the mixing steps can be selected as desired. It is also possible to utilize an alkali metal component in the flux as the alkali component for the alkali metal titanate.

The amount of the alkali metal titanate to the flux can be in the range of 5–50 mole % preferably 10–40 mole % as $(K_2O)_{1/6}\cdot TiO_2$. However, the stability in the formation of the fibrous alkali metal titanate is highly affected by an alkalinity of the molten flux mixture.

When the alkali metal has an atomic number less than that of potassium, such as the use of sodium in the preparation of fibrous sodium titanate, the alkalinity of the molten flux mixture is lower than the optimum condition whereby the rutile type titanium oxide is simultaneously formed and it is necessary to increase the alkalinity of the molten flux mixture.

Accordingly, it is preferable to add excess $Na_2O$ component which is more than the amount of $Na_2O$ component included in sodium tungstate or sodium molybdate.

In the heating operation after mixing the flux with the alkali metal titanate or the alkali metal titanate-forming component, the maximum temperature can be selected depending upon the melting temperature or decomposing temperature of the fibrous alkali metal titanate, and the minimum temperature can be selected depending upon the melting temperature of the flux.

Accordingly, the temperature is in a range of 700° to 1,350° C preferably 1,000° to 1,350° C.

After melting the mixture, the molten mixture can be treated by various methods such as gradually cooling the molten mixture; a method of vaporizing the flux; locally cooling a part of the molten mixture, imparting a temperature difference between the upper and lower parts of the molten mixture, or a combination thereof, because it is necessary to provide for the supersaturation of the alkali metal titanate.

In an industrial operation, it is possible to attain a continuous operation by separating only molten flux from a molten mixture after forming the fibrous alkali metal titanate and admixing the balanced amount of the alkali metal titanate and the lost flux component with the separated molten flux, in order to the continuous operation and the recovery of the flux.

When the fibrous alkali metal titanate is prepared by using only the flux and powdery titanium dioxide to react the titanium dioxide with the alkali component of the flux, it is necessary to adjust the composition of the molten flux mixture to provide for the reacted alkali component.

The fibrous alkali metal titanium separated from the flux mixture can be completely separated by washing it with hot water.

In order to industrially operate the process of the invention, it is preferable to prepare it under a constant temperature and the size of the fibrous alkali metal titanate can be controlled by varying the maintaining temperature.

The following two types of mechanism of growth of the fibrous alkali metal titanate can be considered:

1. The fibrous alkali metal titanate is grown after reacting a solid titanium dioxide with a molten alkali metal oxide in the molten flux mixture:
2. The fibrous alkali metal titanate is grown after precipitating the molten alkali metal titanate from the molten flux mixture.

The amount of the former is larger than that of the latter. Even though the vaporation of the flux is quite small, the reaction can be completely performed under the constant temperature and the fibrous alkali metal titanate is grown in high yield.

The reaction may be remarkably improved by the molten flux mixture. It is possible to add a suitable amount of the other additive in the mixture for varying the thermal, optical and physical characteristics of the fibrous alkali metal titanate.

In accordance with the process for preparing the fibrous alkali metal titanate of the invention, a relatively large size of the fibrous alkali metal titanate can be obtained by a simple flux method. As the alkali metal tungstate or molybdate is used as the flux, the recovery of the flux is possible and the amount of the vaporized flux is quite small so as to be essentially non-polluting and the handling operation is easy so that is possible to use large size apparatus.

The invention will be further illustrated by certain examples.

EXPERIMENT 1

Fibrous potassium titanate

A pure anhydrous potassium tungstate ($K_2WO_4$), $TiO_2$ powder (99.99%) and a pure potassium carbonate ($K_2CO_3$) were used.

The tests were conducted by using a 30 ml platinum crucible.

The constant temperature maintaining method and the slow cooling method were applied and the results were compared.

The melting furnace was a silicon carbide electric furnace having 5 KW.

In the first test, the flux and the $TiO_2$ powder were used as starting materials.

Upon observation of the conditions of melting the $TiO_2$ powder, it was found that the most of $TiO_2$ powder reacts with $K_2O$ component of the molten mixture before melting the $TiO_2$ powder, to form the fibrous potassium titanate.

Of course, a part of the $TiO_2$ powder is melted in the flux mixture.

From the above-mentioned fact, it is clear that the reaction for forming the fibrous potassium titanate in the molten flux mixture is remarkably improved.

In order to effectively utilize the characteristics of the molten flux mixture, the fibrous potassium titanate ws prepared by reacting the $TiO_2$ powder with the $K_2CO_3$ powder in the molten flux mixture, without varying the composition of the molten flux mixture.

The results are shown in Table 1.

In the case of the constant temperature maintaining method at 1,200° C, it is possible to attain 60-100% of yield to the starting materials by reacting for longer than 1 hour. The amount of the vaporized flux is only several wt.%.

In the slow cooling method, the minimum temperature was 950°-1000° C, and the reacting time was depending upon the cooling speed.

The reacting time was about 50 hours under the cooling speed of 4° C/hour. The amount of vaporized flux and the yield were substantially same with those of the constant temperature maintaining method.

The size of the fibrous product were not uniform, because of two types of the growth mechanisms.

The size of the resulting fibrous product by the constant temperature maintaining method was substantially same with that of the slow cooling method.

When a mixture of 80 mole % of the flux and 20 mole % of the potassium titanate forming components were heated and annealed from 1,200° to 1,000° C at a rate of 4° C/hour, the results were good to obtain the maximum fibrous product having a length of 3 × 10,000 μ, which forms a bundled one having a diameter of about 100 μ which is similar to asbestos fibers.

The identification of the fibrous product was conducted by X-ray diffraction analysis, after washing it with hot water and drying it. The following two types of product were found.

1. a single phase of $K_2O(TiO_2)_6$
2. a composite phase of $K_2O(TiO_2)_4$ and $K_2O(TiO_2)_6$ The single phase of $K_2O(TiO_2)_6$ was formed when the amount of $K_2CO_3$ is smaller than the amount of $K_2O$ component for the formation of $K_2O(TiO_2)_6$ as the starting material. In said case, the yield was relatively low, about 87% maximum.

On the other hand, when the amount of $K_2CO_3$ is equivalent to the $K_2O$ component of the composition of $K_2O(TiO_2)_6$ as the starting material, the composite fibrous product of mixture of the composite phases (2) was obtained.

When the composition of $K_2O(TiO_2)_4$ was heated at 1200° C for longer than 30° C, $K_2O(TiO_2)_4$ was disappeared to remain only $K_2O(TiO_2)_6$ which was found by X-rays analysis.

The rection may be as follows

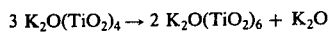

$$3\ K_2O(TiO_2)_4 \rightarrow 2\ K_2O(TiO_2)_6 + K_2O$$

It was found that $K_2O(TiO_2)_4$ phase is simultaneously hydrated in $K_2O(TiO_2)_4.nH_2O$ phase by dissolving the flux with water.

According to the differential thermal analysis and the high temperature X-rays diffraction analysis, the $K_2O(TiO_2)_4.nH_2O$ phase was converted to $K_2O(TiO_2)_4$ by dehydration at a ratio of 5-7 wt. % at from 40° to 300° C.

The composition and structure of the hydrate phase has been unclear.

When the mixture of the flux of potassium tungstate with potassium carbonate is used, it is necessary to heat the resulting fibrous product under the temperature of at least 1,200° C, whereby only $K_2O(TiO_2)_6$ composition (melting point of 1370° C) as the most stable phase at high temperature can be obtained.

EXPERIMENT 2

Fibrous potassium titanate

Potassium molybdenate ($K_2MoO_4$) produced by mixing $MoO_3$ powder with $K_2CO_3$ powder at a molar ratio of 1 : 1 and heating them at 900° C for several hours, was used as the flux.

A mixture of the flux and titanium dioxide at a molar ratio of 85 : 15 was filled in a 30 ml of platinum crucible and the mixture was melted at 1,200° C and was annealed to 1050° C at a rate of 4° C/hour.

The resulting fibrous product was separated by washing it with a hot water from the flux. A loss of the flux by vaporization was about 1 wt.% and the yield was about 80 wt.%. The fibrous product comprises fine powdery crystals having a size of 10 × 150 μ; aggregated fine crystals having a size of 10–50 μ and acicular crystals having a size of 70 × 3,000 μ.

According to x-ray diffraction analysis, the fibrous products had the formula of $K_2O(TiO_2)_6$ composition.

A mixture of 30 mole of the powdery $(K_2O)_{1/6} \cdot TiO_2$ and 70 mole % of the flux was heated at 1250° C for 1 hour at 1250° C under the predetermined temperature, whereby the fibrous product was grown.

A loss of the flux caused by the vaporization was about 5 wt.% and the yield was about 94%.

The fibrous product comprises fine crystals in powdery and aggregated condition which has a diameter 15–150 μ, and acicular crystals having a size of 150 × 10,000 μ.

According to x-rays diffraction analysis, only $K_2O(TiO_2)_6$ composition was found.

A mixture of 40 moles of $(K_2O)_{1/6} \cdot TiO_2$ powder and 60 moles of the flux was heated at 1250° C under the constant temperature for 45 minutes.

A loss of the flux by vaporization was about 3.5 wt.% and the yield was about 98 wt.%. The fibrous product comprises acicular crystals having a size in a range of 10 × 500 μ to 70 × 4,000 μ.

According to x-rays diffraction analysis, the fibrous product was made of $K_2O(TiO_2)_6$.

The process for preparing the fibrous alkali metal titanate by using the alkali metal tungstate or molybdate has the following facts which are found in the above-mentioned experiments.

1. The alkalinity of the molten flux mixture is suitable.
2. The fibrous crystals of alkali metal hexatitanate $M_2O(TiO_2)_6$ which are stable at high temperature are preferentially produced.
3. The separation and washing of the fibrous product from the flux can be easily conducted with hot water.
4. The flux component can be a reaction promoter and an amount of the flux vaporized is quite small and can be recovered.
5. The size and crystallinity of the crystals are remarkably high.
6. The yield of the fibrous product is remarkably high.

Table 1:

| Preparation of fibrous potassium titanate | | | | |
|---|---|---|---|---|
| Constant Temperature Method: | | | | |
| Starting materials | | | | |
| $(K_2O)_{1/6} \cdot TiO_2$ (mole %) | 10 | 20 | 30 | 30 |
| $K_2WO_4$ (mole %) | 90 | 80 | 70 | 70 |
| Temperature (° C) | 1,200 | 1,200 | 1,200 | 1,250 |
| Reaction time (hr.) | 45 | 50 | 26 | 40 |
| Amount of vaporized flux (wt. %) | 7.8 | 2.5 | 1.9 | 1.7 |
| Yield (%) | 62.5 | 95.2 | 69.0 | 97.0 |
| Size of fibrous product (μ) | 10×80~ 30× 3,000 | 15×200~ 300× 10,000 | 10×300~ 150× 6,000 | 5×150~ 100× 5,000 |
| Annealing Method: | | | | |
| Starting materials | | | | |
| $(K_2O)_{1/6} \cdot TiO_2$ (mole %) | 15 | 20 | 30 | |
| $K_2WO_4$ (mole %) | 85 | 80 | 70 | |
| Temperature | | | | |
| Maximum temp. (° C) | 1,250 | 1,200 | 1,250 | |
| Minimum temp. (° C) | 1,000 | 1,000 | 1,020 | |
| Annealing speed (° C/hr) | 4 | 4 | 4 | |
| Amount of vaporized flux (wt. %) | 4.7 | 1.3 | 2.8 | |
| Yield (%) | 65.5 | 95.2 | 93.1 | |
| Size of fibrous product (μ) | 5×150~ 80× 5,000 | 15×300~ 30× 10,000 | 10×150~ 30× 1,000 | |

$K_2CO_3$ and $TiO_2$ were mixed to form $(K_2O)_{1/6} \cdot TiO_2$.

We claim:

1. A process for preparing a fibrous alkali metal titanate, which comprises:

mixing 5–50 mole % of an alkali metal titanate of the formula: $M_2O (TiO_2)_n$, wherein M is sodium, potassium, rubidium or cesium and n ranges from 1 to 7, or an alkali metal titanate forming components with a flux of sodium, potassium, rubidium or cesium tungstate or molybdate, wherein the alkali metal component of each reactant is the same alkali metal;

melting the mixture at a temperature of 700°–1350° C, whereby said alkali metal titanate grows as a fibrous material; and recovering said fibrous alkali metal titanate from said flux.

2. The process of claim 1, wherein said alkali metal titanate-forming components are a mixture of titanium oxide and an alkali metal hydroxide or carbonate.

3. The process of claim 1, wherein the fibrous product is grown in the molten flux mixture at substantially constant temperature.

4. The process of claim 1, wherein the fibrous product is grown in the molten flux mixture while annealing said mixture.

5. The process of claim 4, wherein the molten flux is annealed at a rate of about 4° C/hour.

* * * * *